F. W. ALCORN.
SEEDER AND PLANTER.
APPLICATION FILED DEC. 20, 1913.
1,112,962.
Patented Oct. 6, 1914.
2 SHEETS—SHEET 1.
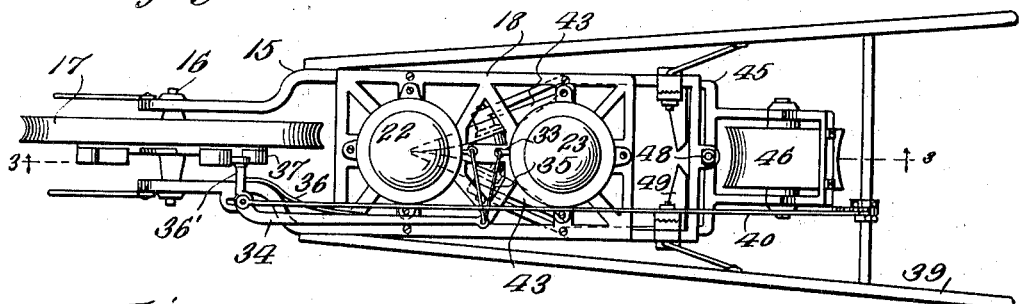
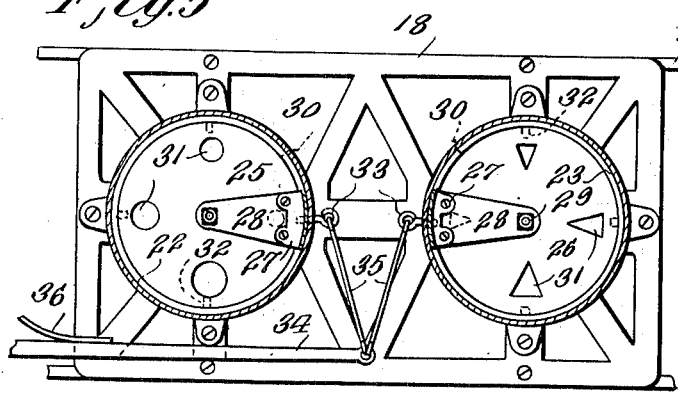
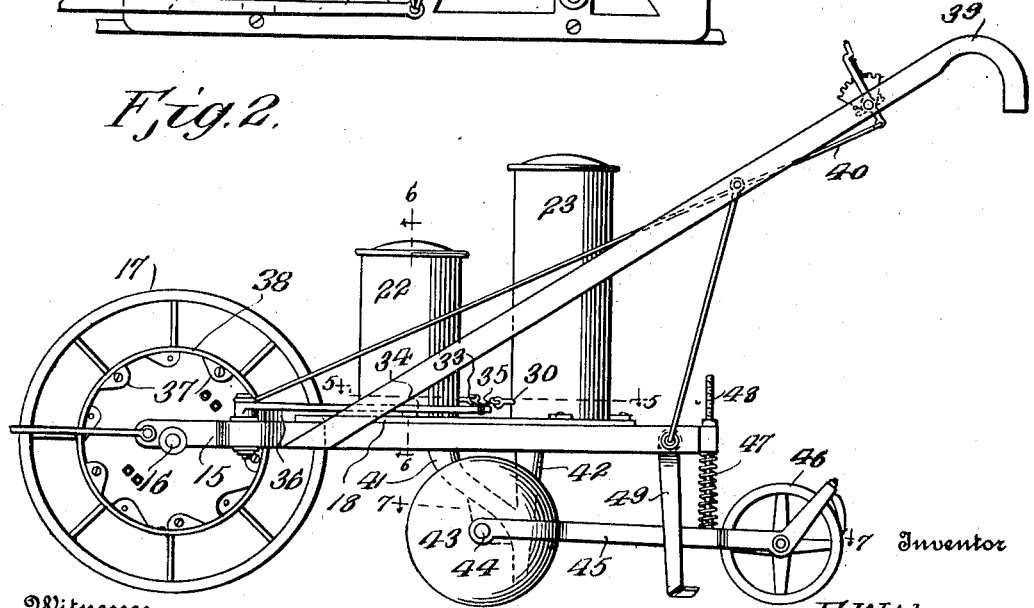
Witnesses
Frank Hough
Wm. Dagger
Inventor
F. W. Alcorn
By Victor J. Evans
Attorney

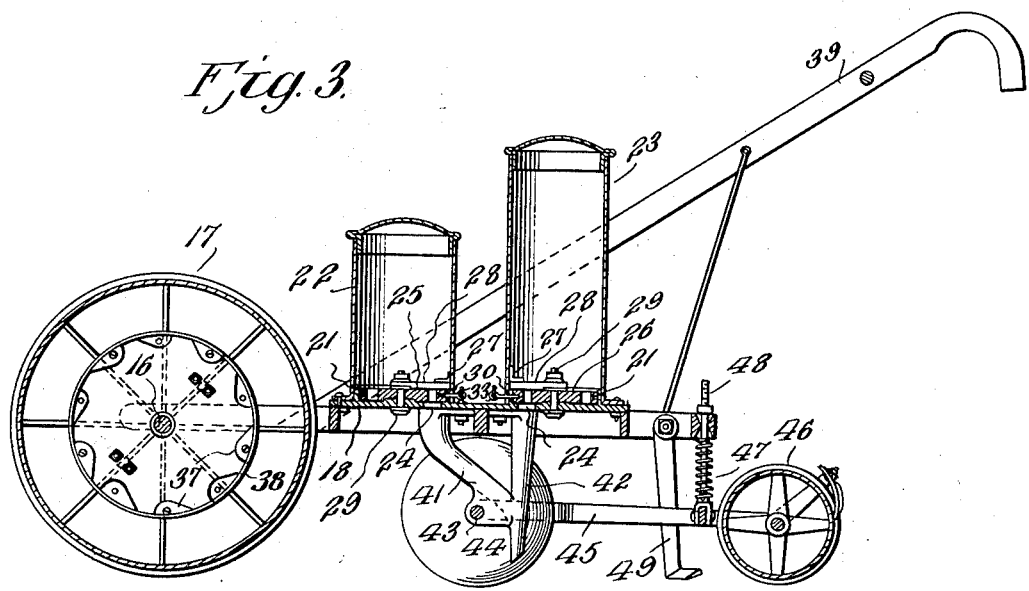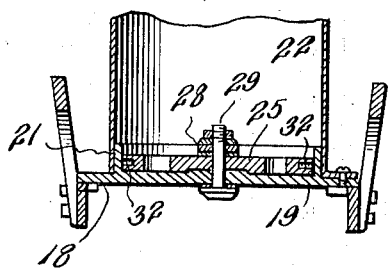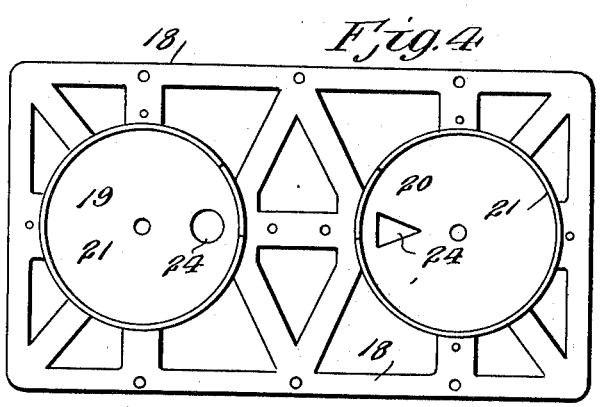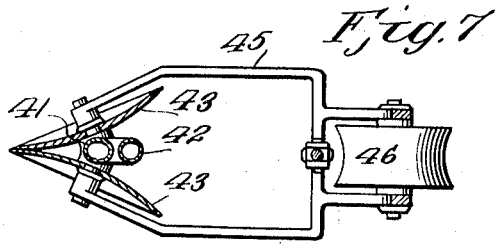

UNITED STATES PATENT OFFICE.

FRANCIS W. ALCORN, OF DARLINGTON, PENNSYLVANIA.

SEEDER AND PLANTER.

1,112,962.    Specification of Letters Patent.    Patented Oct. 6, 1914.

Application filed December 20, 1913. Serial No. 807,968.

*To all whom it may concern:*

Be it known that I, FRANCIS W. ALCORN, a citizen of the United States, residing at Darlington, in the county of Beaver and State of Pennsylvania, have invented new and useful Improvements in Seeders and Planters, of which the following is a specification.

This invention relates to seeders and planters, and it has particular reference to a corn planter adapted to be operated with a single draft animal and which also may be utilized as a fertilizer distributer.

The principal object of the invention is to produce a one-horse corn planter and fertilizer distributer of simple and improved construction which may be utilized at will for planting corn in hills or for drilling the same.

A further object of the invention is to produce a one-horse corn planter which may be equipped with a fertilizer distributer of simple and improved construction.

A further object of the invention is to provide a very simple and efficient construction whereby the dropping plate or plates may be readily adjusted to vary the quantity of material dropped at each operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a combined planter and fertilizer distributer constructed in accordance with the invention. Fig. 2 is a side elevation of the same. Fig. 3 is a longitudinal sectional view taken on the line 3—3 in Fig. 1. Fig. 4 is a top plan view of the base frame plate of the machine. Fig. 5 is a horizontal sectional detail view taken on the line 5—5 in Fig. 2. Fig. 6 is a vertical transverse sectional detail view taken on the line 6—6 in Fig. 2. Fig. 7 is a sectional detail view taken on the line 7—7 in Fig. 2.

Corresponding parts in the several figures are denoted by like characters of reference.

The frame 15 of the improved machine is provided at its forward end with bearings for a shaft or axle 16 supporting the ground wheel 17. The frame supports in rear of the ground wheel a base plate 18 which may consist of a skeleton casting having circular front and rear bottom plates 19, 20, each surrounded by an upstanding annular flange 21. Fitted over the flanges 21 are the circular cans or hoppers 22, 23 which serve as receptacles for corn and fertilizing material, respectively. The bottom plates 19, 20 are provided adjacent to their proximate edges with apertures 24 for the passage of material. The cans 22, 23 may be bolted upon or otherwise detachably connected with the base plate 18.

Dropping plates 25, 26 which consist of circular plates or disks of proper thickness are fitted loosely within the respective cans 22, 23, resting on the bottom plates 19, 20. Each can is provided with interiorly disposed lugs 27 to support a sector-shaped cut-off plate 28 which is positioned directly above the dropping plate, the parts being assembled by a bolt 29 passing through the cut-off plate, the dropping plate and the bottom plate associated with each can. This construction enables the parts to be very readily assembled or disassembled so that needed repairs may be quickly and inexpensively made.

The receptacles are provided in their opposed side walls with slots 30, each of said slots being disposed horizontally and in registry with the dropping plate in each receptacle. Each dropping plate is provided with a plurality of apertures 31 disposed in circumferential series, said apertures being of various area to form pockets of various capacity for the reception of seed or fertilizing material. The apertures in the seed plate have been shown of circular shape and those in the fertilizer plate of triangular shape, but the shapes may be varied at will. Each dropping plate is provided in the rim thereof with threaded recesses 32 for the reception of an eye bolt 33, said recesses being positioned opposite the apertures or pockets 31. In assembling the parts each dropping plate is rotated about its axis which is the axis of the bolt 29, until the aperture 31 of the desired size is positioned between the bottom plate and the cut-off plate; the eye bolt 33 is then engaged with the recess 32 through the slot 30, which latter is of sufficient length to permit the dropping plate to be rocked about its axis until the aperture or pocket is carried clear of the dropping plate to receive a charge from the contents of the receptacle, after which the dropping plate may be restored to a position where the pocket will aline with the aperture 24 in the bottom plate to permit the charge to drop therethrough.

For the purpose of actuating the dropping plates mechanism is provided including a lever 34 which is fulcrumed on the base frame, one arm of said lever being connected with the eye bolts 33 by means of link rods 35, whereby the dropping plates may be pushed in one direction; a retracting spring 36 is also provided to make a quick and effective retractive movement. The other arm of the lever is provided with a head 36' lying in the path of beveled tappets 37 associated with a disk 38 which is operatively connected with the ground wheel. The tappets 37 are bolted upon or otherwise detachably connected with the disk 38, and the number of said tappets may be varied at will, it being also understood that said tappets may be disposed any desired distance apart. The machine is provided with handles 39 adjacent to one of which is supported a rod 40, one end of which is suitably connected with the lever 34, the head 36' of which may thereby be moved out of the path of the tappets 37 when it shall be desired to throw the machine out of operation.

Connected with and extending downwardly from the base plate 18 are downwardly extending tubes or ducts 41, 42, said ducts being properly positioned with respect to the apertures 24 to convey the seed and fertilizing material to the ground. The seed tube or duct 41 serves to support the furrow opening disks 43, said disks being journaled on bolts or studs 44 from which frame bars 45 extend rearwardly to support a presser disk 46, said disk being forced downwardly by the action of a spring 47 coiled about a rod 48, one end of which is guided through an aperture in the frame 15, and the other end of which is connected with the frame bars 45. Covering blades may also be provided at the rear end of the frame of the machine, as indicated at 49. I would have it understood that the covering blades and the presser disk may be dispensed with when desired and also that furrow opening means other than the disks 43 may be used. It will, furthermore, be understood that the fertilizer dropping means may be dispensed with when desired, or that said fertilizer dropping means may be temporarily thrown out of action without interfering with the operation of the seed dropping means by simply detaching the link rod 35 that connects the actuating lever 34 with the dropping plate in the fertilizer receptacle.

In the operation of this invention, when the machine is drawn over the ground, the actuating lever will be rocked in one direction by engagement with the tappets 37, thereby oscillating the dropping plates until one of the pockets or apertures in each plate is drawn from beneath the cut-off plate to receive a charge. When the lever becomes disengaged from the tappet, it is restored to its initial position by the action of the retracting spring 36, causing the dropping plates to be retracted with a quick and snappy movement that will cause the contents of the pocket to be discharged through the aperture 24 from whence it is conducted to the furrow which has been opened by the means provided for the purpose. The operation of the covering means and the presser disk is well understood.

Having thus described the invention, what is claimed as new, is:—

1. In a machine of the class described, a base frame having circular bottom plates and twin receptacles rising therefrom, each bottom plate having a discharge aperture, and the receptacles being provided with horizontal slots in their opposed faces, dropping plates mounted for oscillation on the bottom plates within the receptacles, each dropping plate having a plurality of pockets, and each dropping plate having an eyebolt connected with the rim thereof and extending through the slot of the receptacle, cut-off plates within the receptacles, an actuating lever, links connecting one arm of the lever with the eye bolts, tappet means to engage the other arm of the lever, and a retracting spring.

2. In a machine of the class described, twin receptacles having horizontal slots in their opposed faces, oscillatory seed plates in the receptacles, each having a plurality of pockets of various capacity and threaded recesses in the rim thereof opposite the pockets, eye bolts threaded into one recess of each dropping plate and extending through the slot of the receptacle, an actuating lever, tappet means engaging one arm of the lever, and links connecting the other arm of the lever with the eye bolts of the respective dropping plates.

3. In a machine of the class described, a base frame having circular bottom plates provided with discharge apertures near their proximate edges, each bottom plate being surrounded by an upstanding flange, twin receptacles engaging the flanges and bolted on the base frame, said receptacles having horizontal slots in their opposed wall portions, and said receptacles being provided with interior lugs above said slots, dropping plates supported on the bottom plates, cut-off plates supported on the lugs, axial bolts assembling the cut-off plates with the dropping plates and the bottom plates, an eye bolt connected adjustably and detachably with each dropping plate and extending through the slot of the receptacle, a lever fulcrumed on the base frame, tappet means engaging one arm of the lever, links connecting the other arm of the lever with the eye bolts, and a retracting spring, each dropping plate being provided with a circumferentially arranged series of pockets with respect to which the eye bolts are adjustable.

In testimony whereof I affix my signature in presence of two witnesses.

FRANCIS W. ALCORN.

Witnesses:
 OLIVE G. ELDER,
 MARGUERITE L. ALCORN.